US011191365B2

(12) United States Patent
Fromme-Ruthmann

(10) Patent No.: US 11,191,365 B2
(45) Date of Patent: Dec. 7, 2021

(54) ARRANGEMENT WITH A PLURALITY OF SPRING ELEMENTS FOR A CUSHION SUPPORT

(71) Applicant: Froli Kunststoffwerk Heinrich Fromme, Inhaberin Margret Fromme-Ruthmann e. Kfr., Schloß Holte-Stukenbrock (DE)

(72) Inventor: Margret Fromme-Ruthmann, Schloß Holte-Stukenbrock (DE)

(73) Assignees: Froli Kunststoffwerk Heinrich, Schloss Holte-Stukenbrock (DE); Margaret Inhaberin Fromme, Schloss Holte-Stukenbrock (DE); Kfr. E. Fromme-Ruthmann, Schloss Holte-Stukenbrock (DE)

( * ) Notice: Subject to any disclaimer, the term of this patent is extended or adjusted under 35 U.S.C. 154(b) by 329 days.

(21) Appl. No.: 15/516,700

(22) PCT Filed: Oct. 8, 2015

(86) PCT No.: PCT/DE2015/100419
§ 371 (c)(1),
(2) Date: Jul. 12, 2017

(87) PCT Pub. No.: WO2016/055057
PCT Pub. Date: Apr. 14, 2016

(65) Prior Publication Data
US 2017/0347808 A1  Dec. 7, 2017

(30) Foreign Application Priority Data

Oct. 8, 2014  (DE) .................... 20 2014 104 824.3

(51) Int. Cl.
*A47C 23/00* (2006.01)
*A47C 23/04* (2006.01)
(Continued)

(52) U.S. Cl.
CPC ............ *A47C 23/002* (2013.01); *A47C 23/04* (2013.01); *A47C 23/05* (2013.01); *A47C 23/02* (2013.01);
(Continued)

(58) Field of Classification Search
CPC ....... A47C 23/002; A47C 23/04; A47C 23/05; A47C 23/0438; A47C 23/0431;
(Continued)

(56) References Cited

U.S. PATENT DOCUMENTS 122,111 A * 12/1871 Duffy ................... A47C 23/002
5/255
1,273,428 A * 7/1918 Vincent ................ A47C 23/002
5/258

(Continued)

FOREIGN PATENT DOCUMENTS

DE  202010016240 U1  3/2012
EP     1302135 A2    4/2003

OTHER PUBLICATIONS

International Preliminary Report on Patentability for PCT/DE2015/100419; International Filing Date: Oct. 8, 2015; 13 pgs.
(Continued)

*Primary Examiner* — Nicholas F Polito
*Assistant Examiner* — Morgan J McClure
(74) *Attorney, Agent, or Firm* — Schmeiser, Olsen & Watts, LLP

(57) ABSTRACT

An arrangement of spring elements for a cushion support is provided, having a plurality of spring elements, at which between a base and a support disc spring arms are arranged in each case, wherein the spring elements are arranged lying next to one another in such a manner that the support discs of the plurality of spring elements jointly define a support area and connecting elements are interconnected via the
(Continued)

Figure 1:
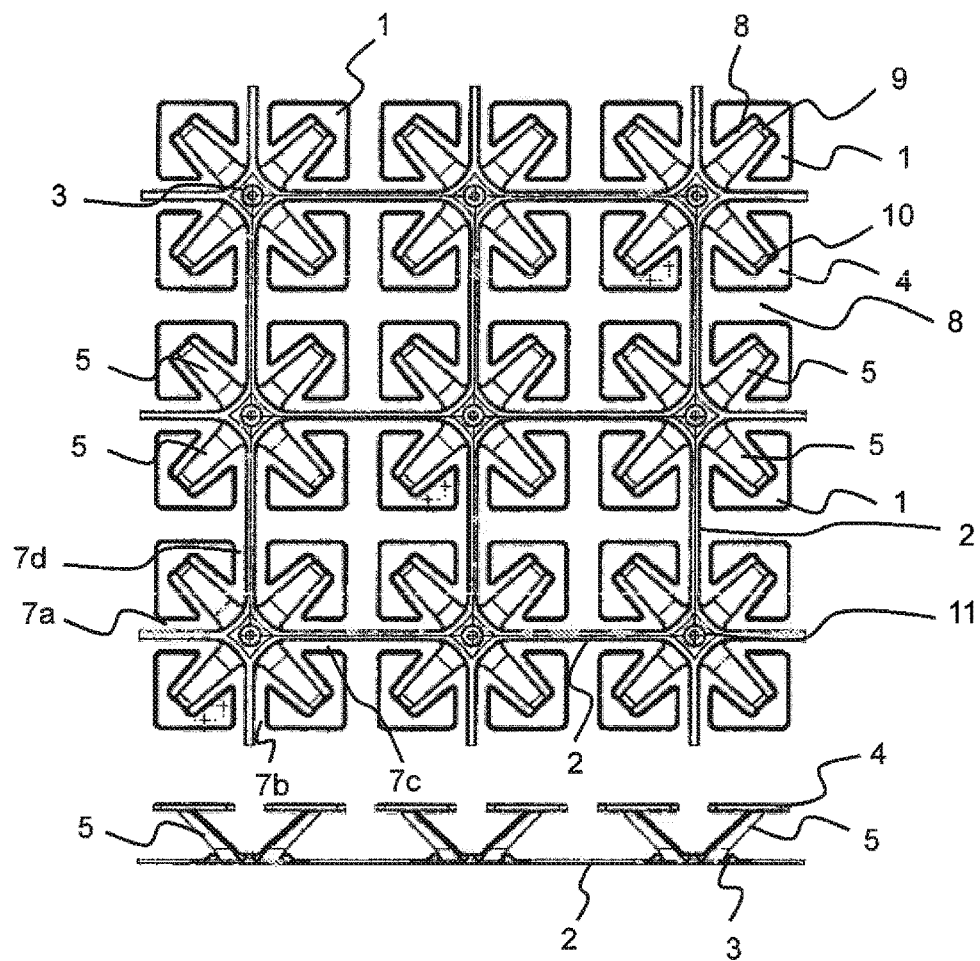

spring elements in such a manner that the spring elements are fixed in their position relative to one another, wherein the connecting elements are formed in one piece and are integrally molded onto the spring elements. The application furthermore includes a stack of spring element arrangements.

13 Claims, 3 Drawing Sheets

(51) Int. Cl.
- *A47C 23/05* (2006.01)
- *F16F 3/087* (2006.01)
- *A47C 23/043* (2006.01)
- *A47C 23/02* (2006.01)

(52) U.S. Cl.
CPC ......... *A47C 23/0438* (2013.01); *F16F 3/0876* (2013.01)

(58) Field of Classification Search
CPC ....... A47C 23/02; A47C 27/065; A47C 23/20; A47C 23/14; A47C 23/125; A47C 23/12; F16F 3/0876
See application file for complete search history.

(56) References Cited

U.S. PATENT DOCUMENTS

| | | | | |
|---|---|---|---|---|
| 4,190,914 A * | 3/1980 | Diallo | A47C 23/0438 | 5/247 |
| 5,165,125 A * | 11/1992 | Callaway | A47C 23/002 | 267/148 |
| 5,588,165 A * | 12/1996 | Fromme | A47C 23/002 | 267/106 |
| 5,785,303 A * | 7/1998 | Kutschi | A47C 23/00 | 267/103 |
| 5,787,533 A * | 8/1998 | Fromme | A47C 23/06 | 5/719 |
| 6,113,082 A * | 9/2000 | Fujino | A47C 23/002 | 267/103 |
| 6,170,808 B1 * | 1/2001 | Kutschi | A47C 27/065 | 267/107 |
| 6,425,153 B1 * | 7/2002 | Reswick | A47C 7/024 | 297/452.53 |
| 6,477,727 B1 * | 11/2002 | Fromme | A47C 23/002 | 267/81 |
| 7,325,261 B2 * | 2/2008 | Bock | A47C 23/00 | 5/236.1 |
| 7,931,257 B2 * | 4/2011 | VanDeRiet | A47C 7/027 | 267/142 |
| 8,185,988 B2 * | 5/2012 | Wieland | A47C 23/05 | 5/247 |
| 9,222,535 B2 * | 12/2015 | Bock | A47C 23/002 | |
| 9,265,354 B2 * | 2/2016 | Mason | A47C 27/148 | |
| D782,861 S * | 4/2017 | Fromme-Ruthmann | | D6/718.31 |
| 2004/0123384 A1* | 7/2004 | Fromme | A47C 23/002 | 5/255 |
| 2007/0262634 A1* | 11/2007 | Brill | A47C 7/28 | 297/452.15 |
| 2008/0128965 A1* | 6/2008 | Bock | A47C 23/002 | 267/101 |
| 2008/0189868 A1* | 8/2008 | Wieland | A47C 23/002 | 5/719 |
| 2010/0058536 A1* | 3/2010 | Fromme-Ruthmann | A47C 7/027 | 5/231 |
| 2010/0301531 A1* | 12/2010 | Delahousse | A47C 7/027 | 267/165 |
| 2012/0066834 A1* | 3/2012 | Jansen | A47C 23/002 | 5/239 |
| 2015/0001772 A1* | 1/2015 | Fornoff | A47C 7/28 | 267/131 |

OTHER PUBLICATIONS

International Search Report for PCT/DE2015/100419 dated Feb. 23, 2016; International Filing Date: Oct. 8, 2015; 2 pgs.

* cited by examiner

ARRANGEMENT WITH A PLURALITY OF SPRING ELEMENTS FOR A CUSHION SUPPORT

CROSS-REFERENCE TO RELATED APPLICATIONS

This application claims priority to PCT Application No. PCT/DE2015/100419 having a filing date of Oct. 8, 2015, based off of German application No. 20 2014 104 824.3 having a filing date of Oct. 8, 2014, the entire contents both of which are hereby incorporated by reference.

FIELD OF TECHNOLOGY

The following relates to an arrangement having multiple spring elements for a cushion support.

BACKGROUND

Such arrangements are utilised in order to produce resilient cushion supports, onto which a cushion for forming a sitting or lying surface can then be placed. Arrangements are known with multiple spring elements, in the case of which the spring elements are arranged distributed over an area according to a regular or irregular structure. The spring elements comprise a base which during the assembly of the spring element on a support, comes to lie on a support, and a support disc and spring arms arranged between them. The support discs of the multiple spring elements jointly form a support surface for the cushion. Embodiments are known, in the case of which each individual spring element is separately fastened on the support for example by means of a screw or a nail, with which the base is fastened onto the support, which can be a wooden board for example. Arrangements are also known in the case of which multiple spring elements are arranged next to one another along a strip in this manner.

In addition to this, arrangements with multiple spring elements are known, in the case of which the individual spring elements are connected with connecting elements, for example by clamping or plug closure. With the help of the connecting elements, a connecting structure is then established which secures the position of the spring elements relative to one another on the support. The fastening of the arrangement so designed using the spring elements on the support can then take place for example with the help of screw means or screw device or nails, which engage through the base of the spring elements and/or the connecting elements formed between the spring elements.

SUMMARY

An aspect relates to an arrangement with multiple spring elements for a cushion support, in which the utilisation characteristics are improved, in particular with respect to a simple assembly.

According to an aspect, an arrangement of spring elements for a cushion support is provided. The cushion support comprises a plurality of spring elements and connecting elements, via which the spring elements are interconnected in such a manner that the spring elements are fixed in their position relative to one another. In the case of the spring elements, spring arms are each arranged between a base and a support disc. The spring elements of the arrangement are arranged lying next to one another in such a manner that the support discs of the multiple spring elements jointly define a support area. The spring elements can be arranged according to a regular or irregular arrangement. The connecting elements, which secure the position of the spring elements relative to one another, are formed in one piece and are integrally moulded onto the spring elements.

Because of this, the arrangement with the plurality of spring elements can be assembled on a support in a simple and efficient manner, wherein a plurality of arrangements with spring elements can be combined for forming the cushion support.

The spring arms between the base and the support disc, which can be embodied leading into the base and/or the support disc directly or via connecting pieces, can be formed as leaf spring arms in sections or entirely. The spring arms of a spring element can be produced with the same spring constant. Spring elements can be combined with one another in the arrangement, in the case of which the spring arms have distinct spring constants. Because of this, the degree of hardness can be established distinctly for example in sections for the cushion support. The spring arms at the spring elements can run emanating from the base to the outside.

The spring elements can also be each formed in one piece. Alternatively, the spring elements can be formed in multiple pieces, for example with multiple sections that can be plugged together.

For each spring element, three, four or more spring arms can be provided. The spring arms can be arranged spaced equidistantly running about the base.

The connecting elements can be moulded to the base and/or to the spring elements in a section of the spring arms adjacent to the base.

The support disc of the spring elements can each be formed with a plurality of separate part support discs, which are separated from one another by intermediate spaces. The intermediate spaces can be formed as gap, wherein a substantially constant gap width between opposite edges of adjacent part support discs can be provided. Cover surfaces of the part support discs can lie in a plane for defining the support area. Two or more, for example four part support discs can be provided on a spring element. Because of the separated design, the part support discs can spring independently of one another when subjected to pressure. The part support discs of a spring element can all be embodied in the same form and construction or distinctly.

When looking down from above on the support disc, the connecting elements can be arranged in the intermediate spaces. The connecting elements lie in the rearward extension of the intermediate spaces when looking from the top down on the support disc insofar as they run in the region of the surface below the support disc, be it partly or completely.

The plurality of separate part support discs can be arranged on one or multiple spring arms which are individually assigned exclusively to the part support disc. The spring arm configuration can be the same for the part support discs of a spring element for all part support discs. Alternatively, distinct spring arm configurations for different part support discs of a spring element can be provided, for example for forming a distinct spring behaviour.

When looking down from the top onto the support discs, the plurality of separate part support discs can laterally extend along the spring arm or spring arms supporting the part support disc. When looking down on the support disc from above, the edges of the part support discs located opposite one another on the one hand and the spring arms on the other hand, can run substantially parallel to one another.

Alternatively, a tapering of a spacing towards radially outside or towards radially inside can be provided.

Looking down on the support disc from above, the plurality of separate part support discs can have a U-shape at least at the inner edge. Looking down on the support element from above, the U-shape at the part support disc can be provided in connection with the edge regions located opposite the associated spring arms. In the regions of the base of the U-recess (U-edge) the spring arm can be moulded onto the part support disc, for example integrally.

When looking down on the spring elements arranged lying next to one another from above, the connecting elements and the spring elements can be formed free of overlap. Looking down on the support disc of the spring element from above, the same is free of any overlaps of any sections of the spring element, be it within and without the spring elements. This applies also when the connecting elements are included.

Looking down from above, gaps can be formed with substantially the same gap width between opposite edges in the region of a spring element. In the region of a gap, the gap width can be substantially constant.

The connecting elements can run corresponding to a rectangular grid. Other grid structures can also be provided, for example polygon, triangle or circle.

At the spring elements distal ends, which with respect to ends that are proximal to the base, are arranged located radially outside, can lead into the support disc. In this embodiment, the proximal end of the spring arm with respect to the base is located radially outside compared with the distal end. Thus, the spring arms extend radially to the outside wherein in the region of an end section leading onto the support disc a partial orientation of the spring arm to radially inside can be provided, for example via a connecting piece on the spring arm.

The spring arm can couple to the support disc via a constriction. The material constriction can be formed circumferentially on opposite sides. A width of the spring arms, for example when looking down on the spring element from above, can taper in the direction of the support disc.

In longitudinal direction and/or in transverse direction, at least two spring elements can be arranged lying next to one another and connected via the connecting elements. In an arrangement, three or more spring elements can also be integrally connected with the help of the connecting elements. For example, an arrangement of 4×4 spring elements is also possible.

The arrangement of spring elements can be produced from an elastomer, for example a thermoplastic elastomer. The arrangement of spring elements, which are integrally connected via the connecting elements, can be produced as injection moulded component.

BRIEF DESCRIPTION

Figure 2:
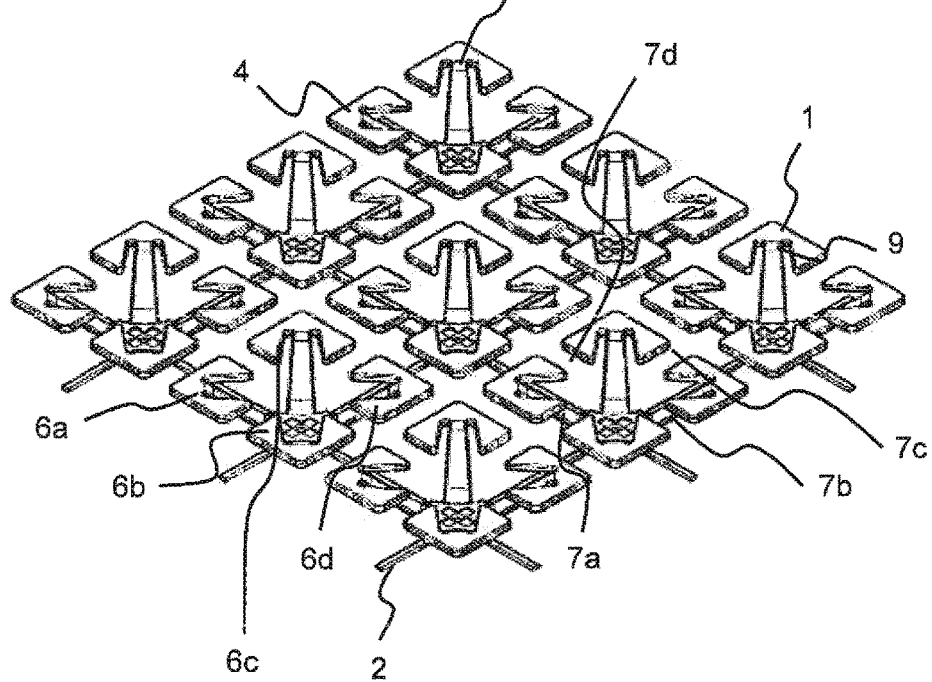
Figure 3:
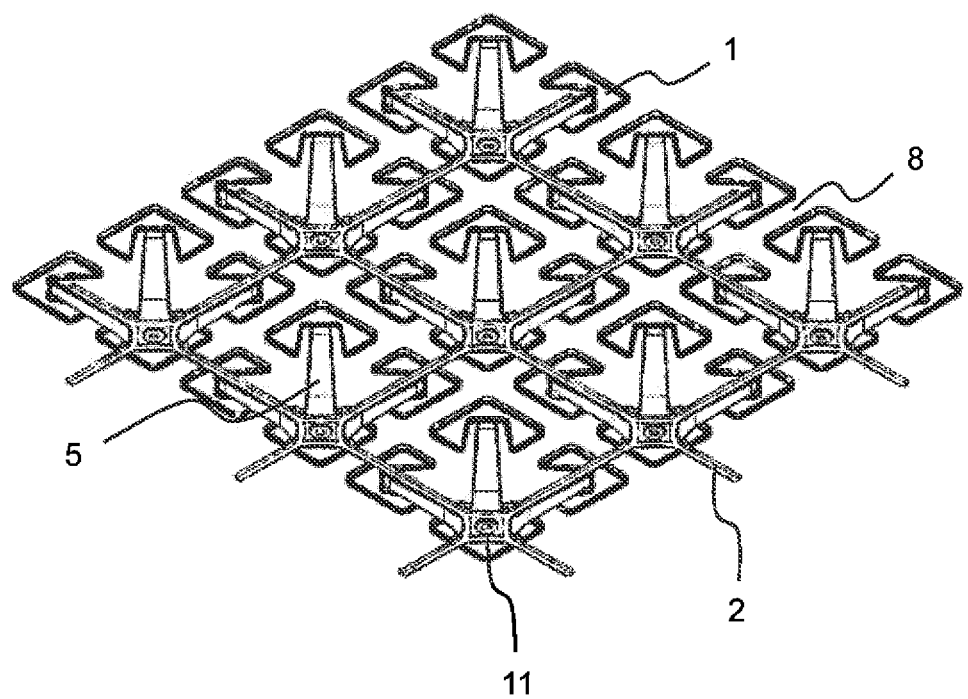

Some of the embodiments will be described in detail, with references to the following figures, wherein like designations denote like members, wherein:

FIG. 1 a schematic representation of an arrangement of spring elements for a cushion support from above and from the front;

FIG. 2 a perspective representation of the arrangement from FIG. 1 obliquely from above;

FIG. 3 a perspective representation of the arrangement from FIG. 1 obliquely from below; and FIG. 4 a perspective representation of a stack of three arrangements with multiple spring elements stacked on top of one another.

DETAILED DESCRIPTION

FIG. 1 shows a schematic representation of an arrangement with a plurality of spring elements 1, which are connected to one another via connecting elements 2, wherein the connecting elements between the spring elements 1 are embodied in one piece and are integrally moulded to the same. The shown arrangement with the multiple spring elements 1 can for example be produced by means of injection moulding, wherein as material an elastomer, in particular a thermoplastic elastomer can be used.

FIGS. 2 and 3 show perspective representations of the arrangement of the plurality of spring elements 1 from FIG. 1 obliquely from above and obliquely from below.

The spring elements 1 each have a base 3 and a support disc 4 and spring arms 5 arranged between them. In the case of the shown embodiment, four spring arms 5 are each equidistantly arranged about the base 3. Starting out from the base 3, the spring arms 4 extend to the support disc 4, which in the case of the shown spring elements 1 is formed with four part support discs 6a, 6b, 6c, 6d. The part support discs 6a, 6b, 6c, 6d are assigned a respective spring arm 5, which individually supports the part support disc 6a, 6b, 6c, 6d.

Between the support discs 6a, 6b, 6c, 6d, separating or intermediate spaces 7a, 7b, 7c, 7d are provided, in which, when looking down on the spring elements 1 from above (see FIG. 1) the connecting elements 2 run.

In the shown embodiment, the connecting elements 2 are integrally moulded onto the respective base 3.

Looking at the spring elements 1 from above according to FIG. 1, gaps 8 run between opposite edges of the part support discs 6a, 6b, 6c, 6d on the one hand and the associated spring arm 5 on the other hand. The part support disc 6a, 6b, 6c, 6d itself is moulded onto the associated spring arms 5 via a material constriction 9, likewise integrally. The spring arm 5 leads into the part support disc 6a, 6b, 6c, 6d in a region 10, which is formed in a floor region of a U-shape.

In the shown embodiment of the arrangement with the spring elements 1, the width of the spring arms 5 tapers towards the support disc 6a, 6b, 6c, 6d.

The respective base 3 of the spring elements 1 comprises an aperture 11, which can be utilised in order to fasten the arrangement of the spring elements 1 on a support using screw and/or nail. Alternatively or complementarily, such apertures can be provided in the region of the connecting elements 2 between the spring elements 1 (not shown).

Figure 4:
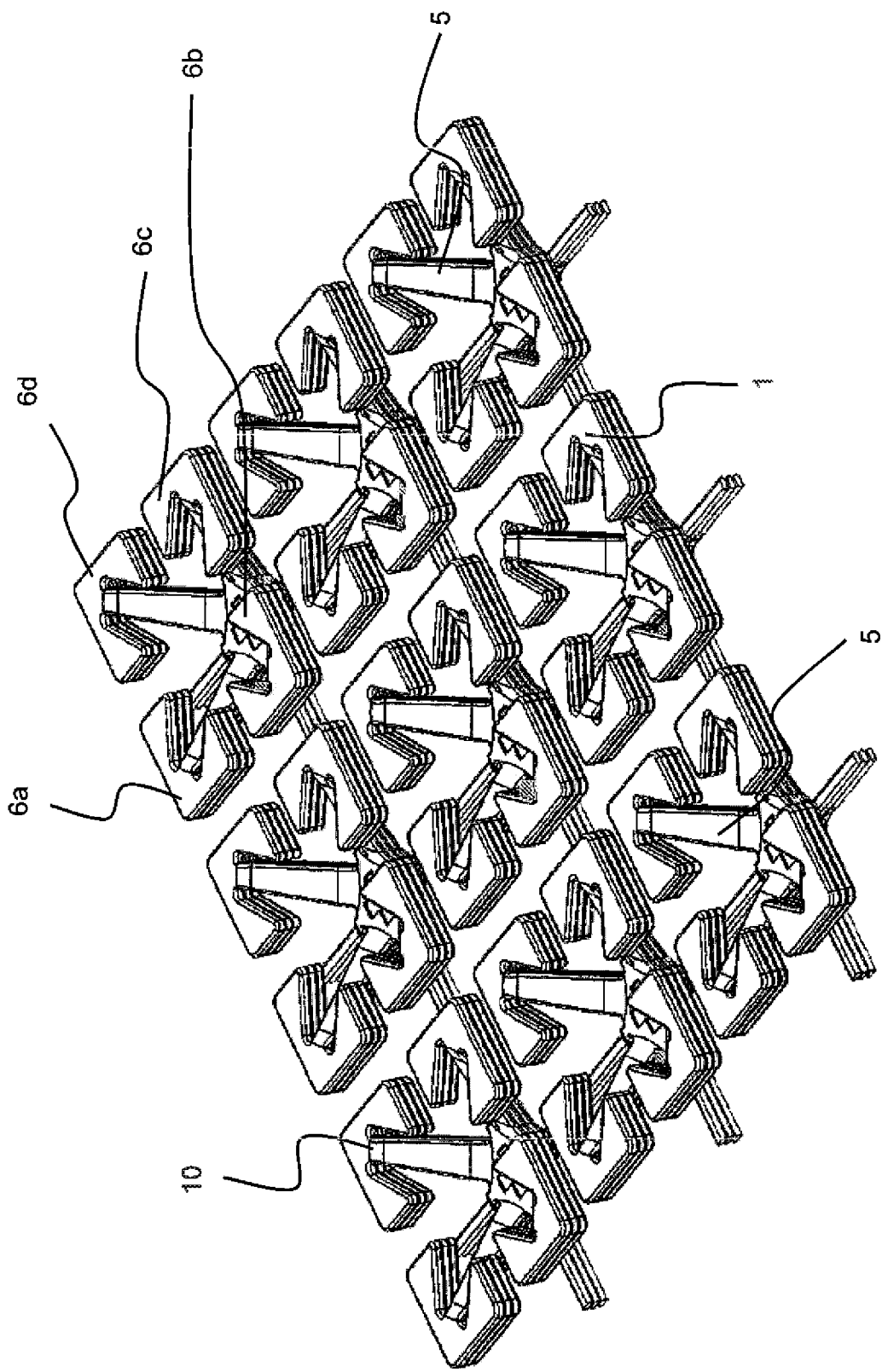

FIG. 4 shows a perspective representation of a stack 20, in the case of which three arrangements with multiple spring elements 1, which are configured corresponding to the arrangement from FIGS. 1 to 3, are stacked on top of one another. It materialises that for arrangements of spring elements 1 lying on top of one another, top and bottom side lie on top of one another in each case, both in the region of the part support disc 6a, 6b, 6c, 6d in the region of the spring arms 5 and also in the region of the connecting elements 2. The arrangement of spring elements 1 described here is thus stackable which can facilitate for example the transport. It can also be provided when forming a cushion support to utilise such a stack of arrangements of spring elements 1 for example for adjusting a certain degree of hardness of the cushion support.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. An arrangement of spring elements for a cushion support, comprising:
   a plurality of spring elements, at which between a base and a support disc, a plurality of spring arms are arranged in each case, wherein the plurality of spring elements are arranged lying next to one another in such a manner that the support discs of the plurality of spring elements jointly define a support area; and
   a plurality of connecting elements, via which the plurality of spring elements are interconnected in such a manner that the plurality of spring elements are fixed in a position relative to one another;
   wherein the plurality of connecting elements are formed in one piece and are integrally moulded onto the plurality of spring elements;
   wherein the plurality of connecting elements form a grid structure comprising first connecting elements extending in a first direction and second connecting elements different from the first connecting elements and extending in a second direction transverse to the first direction;
   wherein the support disc of the plurality of spring elements are formed in each case with a plurality of separate part support discs, which are separated from one another via intermediate spaces;
   wherein, when looking down on the support discs from above, the first connecting elements run in first intermediate spaces extending in the first direction and the second connecting elements run in second intermediate spaces extending in the second direction transverse to the first directions;
   wherein, when the arrangement is stacked, lower sides of the plurality of connecting elements of an upper arrangement rest on top sides of the plurality of connecting elements of a lower arrangement, and lower sides of the plurality of spring elements of the upper arrangement rest on top sides of the plurality of spring elements of the lower arrangement.

2. The arrangement according to claim 1, wherein the plurality of connecting elements are moulded onto the plurality of spring elements at the base and/or in a section of the plurality of spring arms that is adjacent to the base.

3. The arrangement according to claim 1, wherein the plurality of connecting elements, looking down on the support disc from above, run in the intermediate spaces.

4. The arrangement according to claim 1, wherein the plurality of separate part support discs are arranged on one or multiple spring arms which are individually assigned exclusively to the respective part support disc.

5. The arrangement according to claim 1, wherein looking down on the support discs from above the plurality of separate part support discs extend laterally along the spring arm or the spring arms supporting the part support disc.

6. The arrangement according to claim 1, wherein the plurality of separate part support discs looking down on the support disc from above have a U-shape at least at an inner edge.

7. The arrangement according to claim 1, wherein looking down on the spring elements arranged lying next to one another from above, the plurality of connecting elements and the spring elements are formed free of overlap.

8. The arrangement according to claim 7, wherein looking down from above, gaps are formed between opposite edges in a region of a spring element with substantially the same gap width.

9. The arrangement according to claim 1, wherein the plurality of connecting elements run according to a rectangular grid.

10. The arrangement according to claim 1, wherein at the spring elements distal ends, which are arranged at ends which are proximal relative to the base and are located radially outside, couple to the support disc.

11. The arrangement according to claim 1, wherein the spring arms open into the support disc via a constriction.

12. The arrangement according to claim 1, wherein in longitudinal direction and/or in transverse direction at least two spring elements are arranged lying next to one another and connected via the plurality of connecting elements.

13. A stack of spring elements formed into an arrangement according to claim 1, wherein lower sides and top sides of the spring elements and the plurality of connecting elements, respectively, are lying on top of one another.

* * * * *